United States Patent [19]
Hunger et al.

[11] 3,870,796
[45] Mar. 11, 1975

[54] PHARMACEUTICAL PREPARATION
[75] Inventors: Alfred Hunger, Basle; Hans-Jochen Janssen, Riehen, both of Switzerland
[73] Assignee: Ciba-Geigy Corporation, Ardsley, N.Y.
[22] Filed: Sept. 24, 1973
[21] Appl. No.: 400,285

Related U.S. Application Data
[63] Continuation of Ser. No. 201,548, Nov. 23, 1971, abandoned.

[30] Foreign Application Priority Data
Nov. 27, 1970   Switzerland...................... 17597/70

[52] U.S. Cl. .............................................. 424/330
[51] Int. Cl.............................................. A61k 27/00
[58] Field of Search ............ 424/330; 260/570.8 TC

[56]         References Cited
         UNITED STATES PATENTS
3,399,201   8/1968   Schmidt et al............. 260/570.8 TC
3,422,104   1/1969   Schröter..................... 260/570.8 TC

*Primary Examiner*—Stanley J. Friedman
*Attorney, Agent, or Firm*—Joseph G. Kolodny; John J. Maitner; Theodore O. Groeger

[57]            ABSTRACT

A pharmaceutical preparation containing a compound having anti-depressive action and a 9-(aminomethyl)-9,10-dihydro-9,10-ethano- or etheno-anthracene or a non-toxic salt thereof, together with a pharmaceutical carrier is useful for the treatment of anxiety states and nervous tension with depressive syndrome, of the psychovegetative syndrome of the so-called "masked depressions", of hypochondriac behaviour as a consequence of depressive parathymic conditions and disturbed sleep.

1 Claim, No Drawings

PHARMACEUTICAL PREPARATION

CROSS-REFERENCE TO RELATED APPLICATION

This is a continuation of application Ser. No. 201,548, filed Nov. 23, 1971, now abandoned.

The invention relates to new pharmaceutical preparations for treating in particular anxiety states and nervous tension with depressive syndrome, the psychovegetative syndrome of the so-called "masked depressions", hypochondriac behaviour as a consequence of depressive parathymic conditions, and disturbed sleep, especially early awakening.

The invention is based on the observation that disturbances of the kind cited can be treated with particular advantage by administering a pharmaceutical preparation which contains a combination of a compound having antidepressive action with a 9-(aminomethyl)-9,10-dihydro-9,10-ethano- or ethenoanthracene.

Anxiety and depression often co-exist in mental illnesses. In such states, the combination according to the invention of the compound having antidepressive action with the tranquilliser of the ethano or ethenoanthracene type acts as follows: the antidepressant effects a distinct mood-enhancing effect due to its influence on biogenic amines. Simultaneously the tranquilliser exerts an anxiolytic effect and releases tension. This latter effect occurs as a result of influences on subcortical structures and the gamma-fibre system. The combination of a compound having an antidepressive action with a 9-(aminomethyl)-9,10-dihydro-9,10-ethano- or etheno-anthracene that has anticonsulsive and mild damping effects has pharmacological properties which are of a new kind. This combination widens the scope of clinical applicability as compared with the individual active substances so that it is possible to treat not only patients suffering from anxiety and depression, but also patients with a complex syndrome of anxiety-depression and irritability, dejection, excitability, psychosomatic disorders, irregular sleep and more serious forms of mental illness. In addition, this combination is suitable for diminishing the possibilities of severe depression or the occurrence of hallucinations. Possible side effects are very largely eliminated due to the possibility of administering the combinations according to the invention in small therapeutic doses.

As compound having an antidepressive activity there may be considered in particular mono(amino)oxidase inhibitors and preferably thymoleptica, such as 5-aminoalkyl-dibenzo[b,f] azepines, 5-aminoalkylidene-dibenzo[a,d]-(1,4)-cycloheptadienes, 10-aminoalkyl-5-dibenzo[b,e]-(1,4)-diazepines, 9-aminoalkylidene-9,10-dihydro-anthracenes and, above all, 9-γ-aminopropyl-9,10-dihydro-9,10-ethano-anthracenes.

Suitable 5-aminoalkyl-dibenzo[b,f]ozepines are in particular those in which the alkyl part of the 5-aminoalkyl group is a lower alkyl radical, for example one with up to 6 carbon atoms, chiefly with 3 or 4 carbon atoms, especially an n-propyl or 2-methyl-propyl group. The amino group of the 5-amino-alkyl group is a primary or especially a secondary or tertiary amino group, such as a lower alkyl, di-lower alkyl, alkylene, oxaalkylene, thiaalkylene or azaalkylene-amino group, of which the methyl-amino, dimethylamino and the N'-β-hydroxyethyl-piperazino group are particularly to be highlighted. The cited azepines may be hydrogenated in the 10,11-position or possess a 10,11 double bond. Particularly suitable examples are: 5-γ-(N'-β-hydroxyethylpiperazino)-propyl-5H-dibenzo[b,f]azepine, N-(γ-dimethylaminopropyl)-iminodibenzyl, N-(γ-methylaminopropyl)-iminodibenzyl and N-(3'-dimethylamino-2'-methyl-propyl)-imino-dibenzyl, which are used preferably in the form of their salts, particularly the hydrochlorides.

Suitable 5-aminoalkylidene-dibenzo[a,d]-(1,4)-cycloheptadienes are in particular those in which the alkylidene part of the 5-aminoalkylidene group corresponds to the above mentioned alkyl part and represents above all the n-propylidene group. The amino group of the 5-aminoalkylidene group has especially the meaning given above for the amino group of the 5-aminoalkyl group and represents above all the methyl or dimethylamino group. As particularly suitable compounds there may be mentioned: 5-(3-dimethylamino-propylidene)-dibenzo [a,d]-(1,4)-cycloheptadiene and 5-(3-methylamino-propylidene)-dibenzo [a,d]-(1,4)-cycloheptadiene, which are used preferably in the form of their salts, especially the hydrochlorides.

Suitable 10-aminoalkyl-5-dibenzo [b,e]-(1,4)-diazepines are in particular those in which the alkyl part of the 10-aminoalkyl group is a lower alkyl radical, for example one with up to 6 carbon atoms and is above all the ethyl radical. The amino group of the 10-aminoalkyl group has the meaning given above especially for the amino group of the 5-aminoalkyl group and represents primarily the dimethylamino group. In the 5-position these diazepines possess especially a lower alkyl or chiefly methyl group and in the 11-position especially an oxo group. As a particularly suitable compound there may be mentioned 5-methyl-10-β-dimethylaminoethyl-10,11-dihydro-11-oxo-5-dibenzo[b,e]-(1,4)-diazepine, which is used preferably in the form of its salts, especially the hydrochloride.

Suitable 9-aminoalkylidene-9,10-dihydroanthracenes are in particular those in which the alkylidene part of the 9-amino alkylidene group has the meaning given above and represents especially the n-propylidene group. The amino group of the 9-aminoalkylidene group has the meaning given above especially for the amino group of the 5-aminoalkyl group and represents primarily the dimethylamino group. In the 10-position these anthracenes possess preferably two lower alkyl, especially two methyl groups. As a particularly suitable compound there may be mentioned 9-(3-dimethylaminopropylidene)-10,10-dimethyl-9,10-dihydroanthracene, which is used preferably in the form of its salts, especially the hydrochloride.

The 9-γ-aminopropyl-9,10-dihydro-9,10-ethano-anthracenes which are used for preference are in particular those of the formula

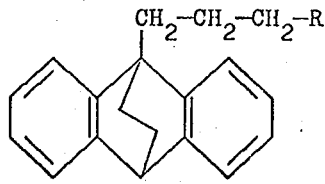

in which R is an amino group, especially one of the kind indicated above for the amino group of the 5-aminoalkyl group, above all a dimethyl, ethyl, diethyl or particularly a methyl-amino group, and which may be substituted in the aromatic rings by at least one chlorine atom, and the salts thereof. To be particularly highlighted is 9-γ-methylaminopropyl-9,10-dihydro-9,10-ethanoanthracene, which is used preferably in the form of its hydrochloride.

The 9-(aminomethyl)-9,10-dihydro-9,10-ethano- or ethenoanthracenes used as tranquillisers are above all those of the formula

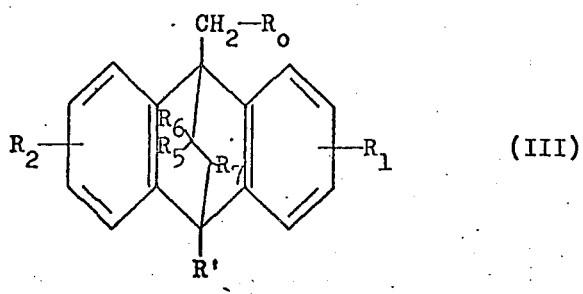

(III)

in which $R_o$ represents an amino group, in particular a mono- or di-lower alkylamino group, such as the dimethylamino, diethylamino, monoethylamino or especially monoethylamino group, $R_1$ and $R_2$ represent lower alkyl radicals, in particular methyl, lower alkoxy radicals, especially methoxy, hydroxyl groups, halogen atoms, particularly chlorine, trifluoromethyl groups, nitro groups, amino groups or hydrogen atoms, and $R_2$ represents preferably hydrogen and $R_1$ is in the 3- or preferably the 2-position, R' represents chlorine, methyl, or preferably hydrogen, $R_5$ represents a hydrogen atom, a hydroxyl group or a lower alkanoyloxy group, for example acetoxy, $R_6$ represents a hydrogen atom or $R_5$ and $R_6$ together represent an oxo group, $R_7$ represents a hydrogen atom or $R_6$ represents a hydrogen atom and $R_5$ and $R_7$ together represent a second bond.

Among this group of compounds there may be mentioned: 9-(ethylaminomethyl)-12-hydroxy-9,10-dihydro-9,10-ethano-anthracene, 9-(diethylaminomethyl)-12-hydroxy-9,10-dihydro-9,10-ethanoanthracene, 9-(dimethylaminomethyl)-12-hydroxy-9,10-dihydro-9,10-ethanoanthracene, 9-(dimethylaminomethyl)-12-oxo-9,10-dihydro-9,10-ethanoanthracene, 9-(dimethylaminomethyl)-12-acetoxy-9,10-dihydro-9,10-ethanoanthracene, 9-(ethylaminomethyl)-12-oxo-9,10-dihydro-9,10-ethanoanthracene, 9-(diethylaminomethyl)-9,10-dihydro-9,10-ethanoanthracene, 9-(dimethylaminomethyl)-9,10-dihydro-9,10-ethanoanthracene, 9-(N-methyl-ethylaminoethyl)-9,10-dihydro-9,10-ethanoanthracene, 2-chloro-9-(methylaminomethyl)-9,10-dihydro-9,10-ethanoanthracene, 1,5-dichloro-9-(dimethylaminomethyl)-9,10-dihydro-9,10-ethanoanthracene, 10-chloro-9-(ethylaminomethyl)-9,10-dihydro-9,10-ethanoanthracene, 10-chloro-9-(diethylaminomethyl)-9,10-dihydro-9,10-ethanoanthracene, 2-chloro-9-(dimethylaminomethyl)-9,10-dihydro-9,10-ethanoanthracene, 2-chloro-9-(diethylaminomethyl)-9,10-dihydro-9,10-ethanoanthracene, 10-chloro-9-(methylaminomethyl)-9,10-dihydro-9,10-ethanoanthracene, 10-chloro-9-(dimethylaminomethyl)-9,10-dihydro-9,10-ethanoanthracene, 2-hydroxy-9-(dimethylaminomethyl)-9,10-dihydro-9,10-ethanoanthracene, 2-hydroxy-9-(methylaminomethyl)-9,10-dihydro-9,10-ethanoanthracene, 2-nitro-9-(methylaminomethyl)-9,10-dihydro-9,10-ethanoanthracene, 2-amino-9-(methylaminomethyl)-9,10-dihydro-9,10-ethanoanthracene, 2-nitro-9-(dimethylaminomethyl)-9,10-dihydro-9,10-ethanoanthracene, 2-amino-9-(dimethylaminomethyl)-9,10-dihydro-9,10-ethanoanthracene, 2-methoxy-9-(dimethylaminomethyl)-9,10-dihydro-9,10-ethanoanthracene, 2-methoxy-9-(methylaminomethyl)-9,10-dihydro-9,10-ethanoanthracene, 9-(dimethylaminomethyl)-9,10-dihydro-9,10-ethanoanthracene.

Amongst this group of compounds, particularly valuable compounds are those of the formulae

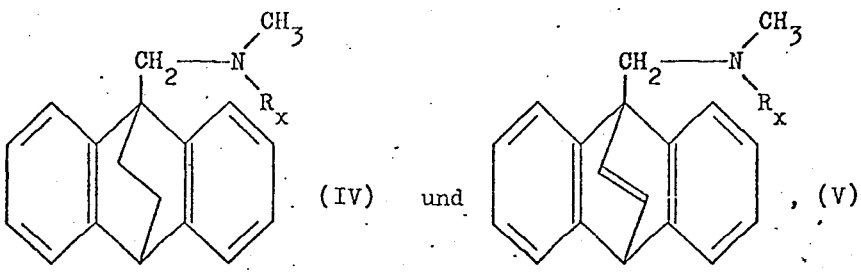

(IV) und (V)

in which $R_x$ represents a methyl radical or a hydrogen atom and very particularly 9-(methylaminomethyl)-9,10-dihydro-9,10-ethenoanthracene, and, above all, 9-(methylaminomethyl)-9,10-dihydro-9,10-ethanoanthracene.

Depending on the number of their assymetric carbon atoms the cited antidepressants and tranquillisers can be in the form of isomer mixtures, pure isomers (racemates) or optical antipodes. They are used preferably in each case in the form of the more active or less toxic isomer or antipode. The cited antidepressants and tranquillisers with basic groups can further be in the free form or in the form of their non-toxic salts. Such salts are especially salts with organic or inorganic acids such, for example, as: hydrohalic acids, sulphuric acids, phosphoric acids, nitric acids, perchloric acid, aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulphonic, ethanesulphonic, hydroxyethanesulphonic and ethylenesulphonic acid; halogenobenzenesulphonic, toluenesulphonic, naphthalenesulphonic acid or sulphanilic acid; cyclohexyl-sulphamic acid, methionine, tryptophane, lysine or argenine.

The invention relates therefore to pharmaceutical preparations which contain a compound having an antidepressive action, especially one of those cited above, together with a 9-(aminomethyl)-9,10-dihydro-9,10-ethano- or ethenoanthracene, in particular one of those cited above, and to the manufacture of these preparations, also to the application of these active substances in the form of the cited preparations or by combined yet separate application for the treatment of all depressive states tinged with anxiety.

Of very especial value are pharmaceutical preparations which contain as compound having antidepressive action a thymoleptic, in particular a 5-aminoalkyl-dibenzo[b,f]azepine, 5-aminoalkylidene-dibenzo[a,d]-(1,4)-cycloheptadiene, 10-aminoalkyl-5-dibenzo[b,e]-(1,4)-diazepine, 9-aminoalkylidene-9,10-dihydroanthracene or, above all, a 9-γ-aminopropyl-9,10-dihydro-9,10-ethano-anthracene, together with a tranquilliser of the formula III and especially of the formula IV and V, and above all, together with 9-(methylaminomethyl)-9,10-dihydro-9,10-ethenoanthracene or 9(methylaminomethyl)-9,10-dihydro-9,10-ethano-anthracene.

The invention relates very particularly to pharmaceutical preparations which contain 5-[γ-(N'-β-hydroxyethylpiperazino)-propyl]-5H-dibenzo[b,f]azepine, N-(γ-dimethylaminopropyl)-iminodibenzyl, N-(Γ-methylaminopropyl)-iminodibenzyl, N-(3'-dimethylamino-2'-methylpropyl)-iminodibenzyl, 5-(3-dimethylaminopropylidene)-dibenzo[a,d]-(1,4)-cycloheptadiene, 5-(3-methylaminopropylidene)-dibenzo[a,d]-(1,4)-cycloheptadiene, 5-methyl-10-β-dimethylaminoethyl-10,11-dihydro-11-oxo-5-dibenzo-[b,e]-(1,4)-diazepine, 9-(3-dimethylaminopropylidene)-10,10-dimethyl-9,10-dihydroanthracene or 9-γ-methylaminopropyl-9,10-dihydro-9,10-ethano-anthracene, together with 9-(methylaminomethyl)-9,10-dihydro-9,10-ethenoanthracene or 9(methylaminomethyl)-9,10-dihydro-9,10-ethano-anthracene.

The invention accordingly is particularly concerned with the use of these preferred preparations or the use of the individual components in a combination therapy.

In the preparations of the invention the ratio of the antidepressant to the tranquilliser of the ethano or etheno type can vary within wide limits.

The dosage of the preparations of the invention naturally depends on the activity of the particular antidepressants and tranquillisers and the individual requirements of the patient. For example, in the case of the component with antidepressive action it can be between half the individual dose and twice the single individual dose, but for preference from half to the simple individual dose is used. Thus, for example, the particularly preferred preparations cited above may contain 10 to 50 mg, especially 20 to 30 mg of 9-γ-methylaminopropyl-9,10-dihydro-9,10-ethano-anthracene hydrochloride. The dosage of the tranquilliser can be between half the individual dose and twice the individual dose, but for preference from half to the simple individual dose is used. Thus, for example, the above cited preferred preparations may contain 5 to 20 mg, especially 5 to 10 mg of 9-(methylaminomethyl)-9,10-dihydro-9,10-ethanoanthracene hydrochloride, or 5 to 20 mg, especially 5 to 10 mg of 9-(methylaminomethyl)-9,10-dihydro-9,10-ethenoanthracene hydrochloride.

The pharmaceutical preparations of the invention are particularly suitable for oral application and may contain the customary carriers such, for example, as lactose, starch, gelatine, colloidal silica, magnesium stearate, talcum, polyvinylpyrrolidone, and similar substances. In addition, they may also contain in admixture other therapeutically useful substances. They are, for example, in the form of tablets, dragees or capsules, and are obtained in the conventional way.

The antidepressants and tranquillisers used are known or can be manufactured in a manner which is in itself known.

The following Examples illustrate the invention, but do not limit its scope.

EXAMPLE 1

Tablets containing 25 mg of 9-γ-methylaminopropyl-9,10-dihydro-9,10-ethanoanthracene hydrochloride and 5 mg 9-(methylaminomethyl)-9,10-dihydro-9,10-ethanoanthracene hydrochloride can be manufactured, for example, in the following composition:

Composition:

| | |
|---|---|
| 9-γ-methylaminopropyl-9,10-dihydro-9,10-ethano-anthracene hydrochloride | 25 mg |
| 9-(methylaminomethyl)-9,10-dihydro-9,10-ethanoanthracene hydrochloride | 5 mg |
| Lactose | 57 mg |
| Wheat starch | 45 mg |
| Colloidal silica | 5 mg |
| Polyvinylpyrrolidone | 5 mg |
| Talcum | 7 mg |
| Magnesium stearate | 1 mg |
| | 150 mg |

The two active substances are mixed with the lactose, the colloidal silica and a portion of the wheat starch. The mixture is sieved and kneaded with an aqueous alcoholic solution of polyvinylpyrrolidone until a plastic mass results. This mass is sieved, dried and the dried granules sieved once more. The remainder of the wheat starch, talcum and magnesium stearate is admixed and the mixture is pressed into tablets weighing 150 mg with dividing groove.

We claim:

1. A pharmaceutical preparation which contains, by weight, 2-5 parts of 9-(γ-methylaminopropyl)-9,10-dihydro-9,10-ethano-anthracene-hydrochloride per part of 9-(methylaminomethyl)-9,10-dihydro-9,10-ethano-anthracene-hydrochloride together with a pharmaceutical carrier.

* * * * *